Patented May 26, 1936

2,041,733

UNITED STATES PATENT OFFICE 2,041,733

PLASTIC COMPOSITION

James H. Werntz, Marshallton, Del., assignor to E. I. du Pont de Nemours & Company, Wilmington, Del., a corporation of Delaware No Drawing. Application November 3, 1934, Serial No. 751,280

9 Claims. (Cl. 106—37)

This invention relates to new compositions of matter, more particularly to certain esters of long chain alcohols, still more particularly to esters of long chain alcohols with carbamic acids, and more specifically to plasticized compositions containing these esters.

Carbamic acid, $H_2N$—COOH, and its various nitrogen substitution products such as phenylcarbamic acid or carbanilic acid have been known particularly in the form of esters, which esters may be prepared in various ways, but not however, in general from carbamic acid itself.

This invention has as an object the preparation of plasticized compositions containing high molecular weight esters of carbamic and substituted carbamic acids.

This object is accomplished by the following invention wherein a high molecular weight alcohol ester of a carbamic or substituted carbamic acid is prepared and formulated into a plastic composition.

Although the preparation of the high molecular weight ester of the carbamic or substituted carbamic acid is not a part of this invention, the following methods for the preparation of these esters are described in order to set forth clearly the nature of the compounds included as plasticizers. The following examples illustrate four methods which may be used in the preparation of these compounds.

*Example 1.—N-dodecyl carbanilate (n-dodecyl phenylcarbamate)*

To 18.9 (0.2 mols) of redistilled anilin dissolved in 100 cc. of ether was added slowly with stirring the n-dodecyl chlorocarbonate prepared by reacting 18.6 g. of n-dodecyl alcohol (0.1 mol.) with 9.9 g. phosgene (0.1 mol.) (the reaction between n-dodecyl alcohol and phosgene being carried out in the presence of toluene and the toluene removed before the addition of n-dodecyl chlorocarbonate to the anilin). When addition of the n-dodecyl chlorocarbonate was complete, the reaction mixture was allowed to stand for several hours and the insoluble anilin hydrochloride was removed by filtration. The ether was evaporated from the filtrate and the remaining product purified by crystallization from ethyl alcohol yielding a white crystalline product melting at about 75° C.

*Example 2.—Octyl carbanilate*

Monophenyl urea may be prepared by the reaction of anilin with urea at about 160° C. followed by crystallization of the product from hot water. A mixture of 272 g. phenyl urea (prepared in this manner) and 260 g. octyl alcohol was heated to 160° C. for three hours during which time a vigorous evolution of ammonia took place. The temperature was then raised slowly to 210° C. and maintained at that temperature for one hour to complete the reaction. The product was poured into hot water and stirred vigorously to dissolve any unreacted phenyl urea. The water insoluble portion was then washed with cold water, dissolved in alcohol, dried, decolorized with carbon, and crystallized, a white and crystalline product being obtained.

*Example 3.—Decyl carbanilate*

A mixture of 119 g. phenyl isocyanate and 158 g. decyl alcohol was allowed to stand at ordinary temperatures for several days and was then warmed to 100° C. for a few hours. The resulting product was crystallized from alcohol yielding a white, crystalline product.

*Example 4.—Naphthenyl N-methylcarbanilate*

A mixture of 169 g. methyl N-methylcarbanilate, 150 g. naphthenyl alcohol, 5 g. litharge, and 200 g. toluol was heated to boiling under a good fractionating column until the theoretical amount of toluol-methanol binary had been distilled. The remaining product was distilled in vacuo to remove toluene and unreacted naphthenyl alcohol. The remaining liquid was decolorized with carbon and filtered, the product being a light-colored, viscous liquid.

The reactions involved in the above examples are represented by the following equations, wherein R is an aliphatic or alicyclic hydrocarbon radical of at least 8 carbon atoms:

1. $ROH + COCl_2 = ROCOCl + HCl$ $ROCOCl + 2C_6H_5NH_2 = ROCONHC_6H_5 + C_6H_5NH_3Cl$

2. $NH_2CONH_2 + C_6H_5NH_2 = C_6H_5NHCONH_2 + NH_3$ $C_6H_5NHCONH_2 + ROH = C_6H_5NHCOOR + NH_3$

3. $C_6H_5NCO + ROH = C_6H_5NHCOOR$

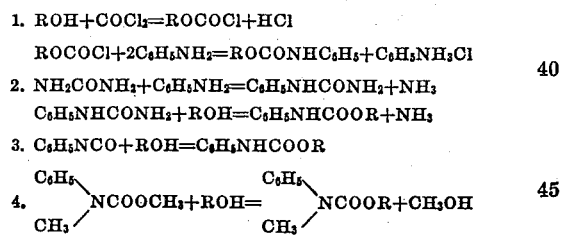

In place of the anilin of Example 1 aromatic primary and secondary amines in general may be employed. Thus methylaniline, ethylaniline, toluidine, naphthylamine, etc., may be used. In place of the alcohols used in each of the above examples, other long chain alkyl alcohols or naphthenyl alcohols containing 8–18 carbon atoms may be used. Specific examples of these are nonyl alcohol, undecyl alcohol, tetradecyl alcohol, octadecenyl alcohol, hexadecyl alcohol, octadecyl alcohol, and the higher branched chain alcohols obtained as by-products in the synthesis of methanol from carbon monoxide and hydrogen as well as the naphthenyl alcohols obtainable by catalytic hydrogenation of naphthenic acids obtained in the petroleum industry. Esters derived from alcohols of more than 18 carbon atoms such as ceryl or melissyl alcohols are so deficient in plasticizing power as to be relatively disadvantageous. Even in the range 8 to 18 carbon atoms, it is not desirable to have a plurality of octadecyl radicals.

These derivatives are readily soluble in ordinary organic solvents and are miscible with a wide variety of materials commonly used in the preparation of plasticized compositions. They may be used in the preparation of plasticized compositions suitable for use as lacquers or for the preparation of plastic compositions. Typical coating compositions containing these derivatives as plasticizers are given in the following examples:

*Example 5*

| | Parts |
|---|---|
| Cellulose nitrate | 12 |
| Damar | 3 |
| n-Dodecyl carbanilate | 4 |
| Castor oil | 2.6 |
| Solvent | 166 |

*Example 6*

| | Parts |
|---|---|
| Cellulose nitrate | 10 |
| Naphthenyl carbanilate | 12 |
| Pigment | 10 |
| Solvent | 20 |

*Example 7*

| | Parts |
|---|---|
| Polyvinyl acetate | 10 |
| Octyl carbanilate | 3 |
| Solvent | 100 |

*Example 8*

| | Parts |
|---|---|
| Ethyl cellulose | 10 |
| Resin | 6 |
| Decyl carbanilate | 6 |
| Paraffin wax | 2 |
| Solvent | 170 |

*Example 9*

| | Parts |
|---|---|
| Polyhydric alcohol-polybasic acid resin | 10 |
| n-Dodecyl tolyl carbamate | 4 |
| Solvent | 50 |

The above lacquers give films which dry in a few minutes and the films are flexible and very durable. Among the above lacquers are to be found lacquers for the preparation of coated fabrics, for the moistureproofing of regenerated cellulose, and for the coating of metal and wood. By the term "solvent" in the above examples is meant suitable mixtures of alcohols, esters, and hydrocarbons such as would be obvious to one skilled in the art.

Typical plastic compositions containing these esters are given in the following examples:

*Example 10*

| | Parts |
|---|---|
| Cellulose isobutyrate | 100 |
| Octyl carbanilate | 20 |

*Example 11*

| | Parts |
|---|---|
| Cellulose nitrate | 100 |
| n-Dodecyl carbanilate | 80 |
| Pigment | 200 |

*Example 12*

| | Parts |
|---|---|
| Ethyl cellulose | 100 |
| Naphthenyl N-methyl-carbanilate | 15 |

*Example 13*

| | Parts |
|---|---|
| Polymerized methyl methacrylate | 100 |
| Octyl carbanilate | 20 |

*Example 14*

| | Parts |
|---|---|
| Cellulose acetate | 100 |
| Dimethoxyethyl phthalate | 40 |
| Octyl carbanilate | 10 |

The above plastic compositions may be prepared with or without the use of volatile solvents, such as alcohol, acetone, or mixtures of toluol-alcohol, etc. It is to be understood that other cellulose derivatives, other natural resins, and other synthetic resins than those above mentioned may be used including cellulose propionate, cellulose butyrate, benzyl cellulose, "Bakelite" resins, ketone condensation resins, ether resins, shellac, etc. Any part of the plasticizer in any of the above compositions may be replaced by other plasticizers of the type of the present invention, or by one or more of the plasticizers known in the art, such as triaryl phosphates, alkyl phthalates, triacetin, etc. Pigments and/or other modifying agents, such as drying oils, semi-drying oils, etc. may be included.

The methods for the preparation of the above plasticized compositions are capable of considerable variation, and the invention is not limited to specific methods disclosed nor to specific compounds disclosed. The invention contemplates all types of cellulose derivatives, all types of natural and synthetic resins, all types of pigments and oils as well as organic fillers, such as wood fiber or cellulose. Furthermore, the invention is not limited to the specific proportion of the compounds disclosed and an amount varying from 5, 10, 20, 30, 40, 50, 60, 70, 80, 90, 100 or even 150 or 200 per cent based on the weight of the cellulose derivative or resin being plasticized may be used.

The following formula indicates the general type of material included within the scope of this invention:

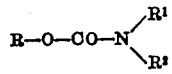

In this formula R is a long chain alkyl or naphthenyl radical containing 8–18 carbon atoms, and $R^1$ and $R^2$ are aryl, aralkyl, alkyl, alicyclic or hydrogen. Thus, R may be octadecyl, octadecenyl, hexadecyl, dodecyl, octyl, and the like. $R^1$ and/or $R^2$ may be naphthyl, benzyl, methyl, butyl, octadecyl, dodecyl, phenyl, cyclohexyl, and the like. In general it is preferred that $R^2$ be hydrogen and $R^1$ be aryl, i. e., the carbanilates and ring substituted carbanilates represent the preferred embodiment of the invention.

The plasticizers of the present invention may be used in the prepartion of all types of compositions containing cellulose derivatives and/or natural or synthetic resins, oils, pigments, and filling materials. Specifically, they may be used in the prepartion of lacquers for coating metal, wood, and paper, in dope for coating fabrics, in moistureproofing lacquers for coating regenerated cellulose, in plastic compositions to be used in the preparation of toilet ware, novelties, sheeting, rods, tubes, safety glass interlayers, etc. and lacquers for coating wire screens, and in the preparation of thin, transparent sheets for wrapping purposes.

One advantage of this invention is that it furnishes extremely high-boiling, water-resistant plasticizers. A further advantage of these materials is their compatibility with cellulose derivatives and natural and synthetic resins, and the permanently flexible products obtained by their use.

The above description and examples are intended to be illustrative only. Any modification of or variation therefrom which conforms to the spirit of the invention is intended to be included within the scope of the claims.

I claim:

1. A composition comprising a cellulose derivative, and as a plasticizer therefor, an ester of the formula

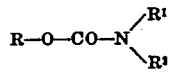

wherein R is an aliphatic hydrocarbon radical of 8–18 carbon atoms, and R¹ is a hydrogen, alkyl, aryl, aralkyl or alicyclic radical and R² is a hydrogen, alkyl, aryl, aralkyl, or alicyclic radical.

2. The cellulose derivative composition of claim 1 wherein in the formula for the plasticizer R¹ is hydrogen and R² is an aryl radical.

3. A composition comprising a cellulose derivative and as a plasticizer therefor an ester of an arylcarbamic acid with a straight chain monohydric aliphatic alcohol of 8 to 18 carbon atoms.

4. A composition comprising a cellulose derivative, and as a plasticizer therefor, an ester of the formula

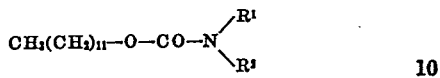

wherein R¹ and R² may be hydrogen, alkyl, aryl, aralkyl, or alicyclic radicals.

5. A composition comprising a cellulose derivative, and as a plasticizer therefor, an ester of the formula

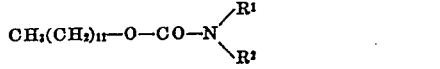

wherein R¹ is hydrogen and R² is an aryl radical.

6. A composition comprising a cellulose derivative, and as a plasticizer therefor, n-dodecyl carbanilate.

7. A composition comprising a cellulose derivative, and as a plasticizer therefor, octyl carbanilate.

8. A composition comprising cellulose nitrate and as a plasticizer therefor a n-dodecyl ester of an arylcarbamic acid.

9. A composition comprising cellulose nitrate and as a plasticizer therefor, n-dodecyl carbanilate.

JAMES H. WERNTZ.

CERTIFICATE OF CORRECTION.

Patent No, 2,041,733.                                           May 26, 1936.

JAMES H. WERNTZ.

It is hereby certified that error appears in the printed specification of the above numbered patent requiring correction as follows; Page 1, first column, line 34, for "18.9" read 18.6 g; and that the said Letters Patent should be read with this correction therein that the same may conform to the record of the case in the Patent Office.

Signed and sealed this 4th day of August, A. D. 1936.

Henry Van Arsdale (Seal)                                                Acting Commissioner Patents.